United States Patent
Chapkovich, Jr. et al.

[11] 3,721,415
[45] March 20, 1973

[54] UNIVERSALLY MOVABLE MOUNTING MECHANISM WITH LOCKING AND UNLOCKING PROVISIONS AND WHEREIN THE UNLOCKING PROVISIONS ARE OPERABLE IN ACCORDANCE WITH OPERATOR FEEL

[75] Inventors: John Steven Chapkovich, Jr., Milford; David Ernest Lee, West Haven, both of Conn.

[73] Assignee: United Aircraft Corporation, East Hartford, Conn.

[22] Filed: June 1, 1970

[21] Appl. No.: 42,422

[52] U.S. Cl. ..................248/214, 248/181, 248/288
[51] Int. Cl. ................................................F16m 13/00
[58] Field of Search......248/181, 214, 288, 481, 482, 248/483, 484; 269/75; 287/12, 90 R

[56] References Cited

UNITED STATES PATENTS

| | | | |
|---|---|---|---|
| 2,638,298 | 5/1953 | Peterson | 248/181 |
| 2,567,169 | 9/1951 | Green et al. | 287/12 |
| 2,648,256 | 8/1953 | Budreck | 287/12 UX |
| 3,350,122 | 10/1967 | Ulderup | 287/90 R |
| 3,212,740 | 10/1965 | Greenberg | 248/181 X |
| 1,780,383 | 11/1930 | Green | 248/181 |

FOREIGN PATENTS OR APPLICATIONS

| | | | |
|---|---|---|---|
| 451,234 | 7/1936 | Great Britain | 248/181 |
| 618,296 | 2/1949 | Great Britain | 248/181 |

Primary Examiner—William H. Schultz
Attorney—Vernon F. Hauschild

[57] ABSTRACT

A universally movable mounting mechanism in which the mounting mechanism is connected to a fixed ball by spherically shaped friction cups which are spring biased toward one another to lock the mounting mechanism in fixed position on the ball and which can be selectively moved away from one another to either totally eliminate the friction between the friction cups and the ball to thereby free the mounting mechanism for universal motion in response to actuation by a pilot operated handle or in which the friction between the friction cups and the fixed ball is selectively reduced so as to maintain a desired mount positioning force in accordance with operator feel as he moves the mounting mechanism through handle motion.

6 Claims, 5 Drawing Figures

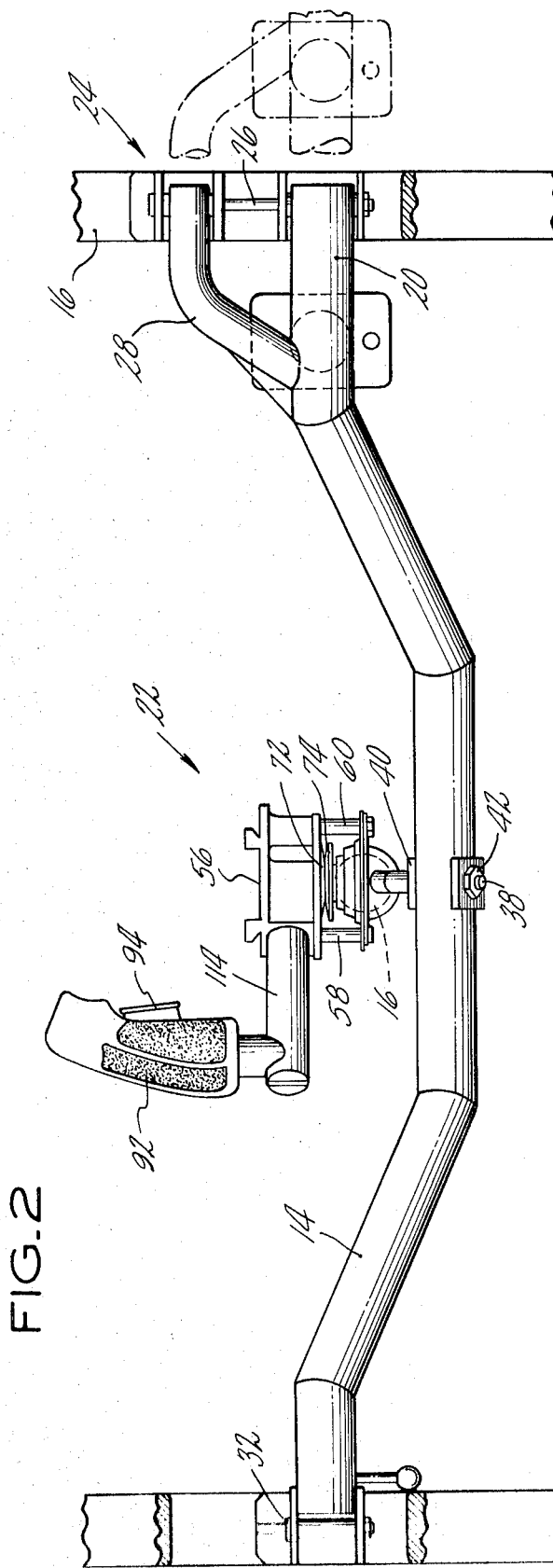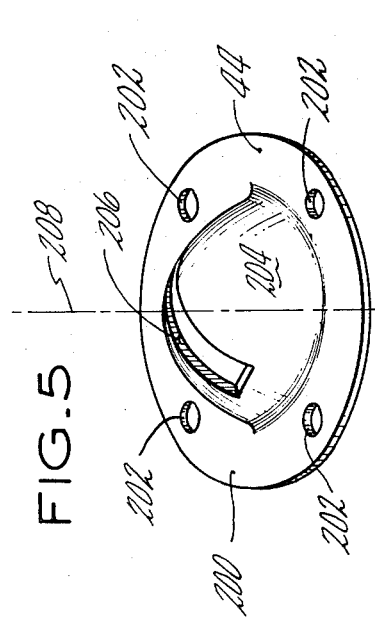

UNIVERSALLY MOVABLE MOUNTING MECHANISM WITH LOCKING AND UNLOCKING PROVISIONS AND WHEREIN THE UNLOCKING PROVISIONS ARE OPERABLE IN ACCORDANCE WITH OPERATOR FEEL

The invention herein described was made in the course of or under a contract or subcontract thereunder with Department of the Navy, Naval Air Systems Command.

BACKGROUND OF THE INVENTION

1. Field of the Invention

This invention relates to the supporting or mounting mechanism for a camera or other viewing apparatus so that the mount can be moved to any selected position through universal motion, so that the mount can be rigidly locked in position, and so that the mount can be either fully or partially released for motion, and particularly to such a mount system wherein these functions can be performed by an operator using but one of his hands.

In some mount installations, such as helicopter night rescue missions, it is important that a direct viewing scope be utilized to locate object and that it be mounted so as to be positively locked in position so that its position is unaffected by aircraft vibration, by aircraft buffeting and maneuver motions and by accidental bumping by the operator. It is also important that the operator be able to control the amount of friction in the mount so as to assist him in accurately positioning and repositioning the mount.

2. Description of the Prior Art

In the mounting art, cameras and other viewing devices have been mounted for universal motion by action of an operator control handle as in U.S. Pat. No. 1,780,383, but this prior art construction includes no provisions for selectively positively locking and unlocking the mount in position. Viewing apparatus have also been mounted for selective motion and locking about a given axis due to a trunnion connection between the viewing apparatus and the mount and have been handle actuated as in U.S. Pat. Nos. 2,667,321 and 2,886,276, but this does not provide the universal motion required by some installations.

SUMMARY OF INVENTION

A primary object of the present invention is to provide an improved viewer mount which permits universal motion of the viewer, which positively locks the viewer in selected position such that very substantial forces would be required to dislarge the viewer so locked, and so that the viewer can be fully released for operator movement to any selected position or can be partially friction released so that the operator can move the viewer by overcoming a selected amount of friction in the mount.

In accordance with the present invention, these various functions can be performed with the operator using but a single hand, enabling him to perform other operations with his free hand.

In accordance with the present invention, the viewer mount is supported from a fixed ball or sphere and is connected thereto by relatively movable friction cup members which are spring biased to frictionally engage the ball and hence lock the viewer in position and which includes provisions to fully or partially relieve the friction force between the friction cups and the ball to permit the operator to move the viewer to any selected position by handle motion.

It is a further object of this invention that the amount of biasing or friction loading between the friction cups and the ball can be preset and can be readily varied in operation.

It is a further object of this invention to mount the viewer so that there is a high velocity ratio linkage system between an operator actuatable trigger on the viewer handle and the viewer support release mechanism so that low force, substantial distance movement of the trigger will result in high force, minute movement of the release mechanism to give the operator a "feel" for the amount of friction remaining between the friction cups and the ball and which must be overcome by handle action to move the viewer to its next selected position.

It is a further feature of this invention that spring members of high spring rate, such as Belleville spring washers, be used to bias the friction cups to their locked position on the mounting ball. This high friction loading between the frictions cups and the mounting ball prevents motion of the viewer from its locked position due to vibrations, support motion and inadvertent bumping thereof, compensates for small machining inaccuracies in the mating parts, protects the mounted equipment when not in use, and compensates for wear between the mounting ball and friction cup.

BRIEF DESCRIPTION OF THE DRAWING

FIG. 2 is an enlarged showing of my mounting means connected to spaced support members, such as an aircraft door.

FIG. 5 is a perspective showing of the static friction cup.

DESCRIPTION OF THE PREFERRED EMBODIMENT

Figure 1:
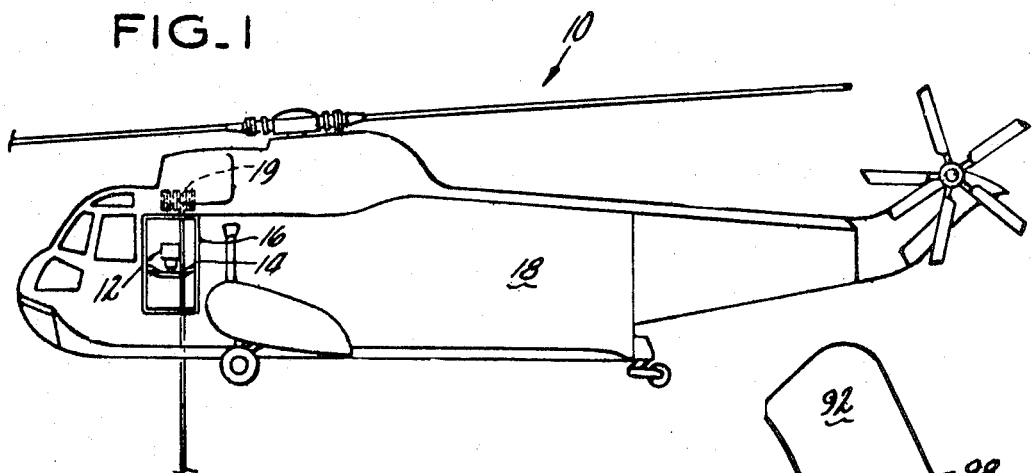
FIG. 1 is a showing of a helicopter hovering above a ground target with a viewing device mounted from the fuselage thereof by my mounting means.

Referring to FIG. 1 we see helicopter 10 hovering above a ground target and with a viewer 12 supported from support tube 14 which extends across doorway 16 of fuselage 18 and is shaped to extend outboard thereof. As an example of the type of function which the viewer mount can perform, it is being shown in this helicopter environment performing this particular rescue mission Other uses for this mount are also possible, such as for a gun sight. An operator stands at the viewer in the helicopter fuse-lage doorway and directs the viewer toward the ground, searching out the target, such as a downed military personnel. When the ground target is in view, it is necessary that the helicopter be brought to hover above the ground target and that a hook from conventional winch mechanism 19 be lowered accurately and quickly to recover the subject. Since the viewer operator is the person who can best see the ground target, it is necessary that the operator perform the functions of operating the viewer, operating the aircraft hover control and operating the rescue hoist control, simultaneously. These last two controls are conventional and form no part of this invention but in view of the fact that the single operator must operate all three mechanisms, it is essential that this single operator be able to selectively train, lock and unlock the viewer in position utilizing one hand, and this is an important feature of my mount system.

Viewing FIG. 2 we see viewer support mechanism 22 which is adapted to support viewing means 12 of FIG. 1 in conventional fashion, mounted on support tube 14. Support tube 14 is pivotally connected to doorway 16 of the helicopter by pivot pin assembly 24 which includes pin member 26 extending through forked legs 28 and 20 of support tube 14, to thereby give support tube 14 and support mechanism 22 substantial support strength as it extends in cantilever fashion across doorway 16. Lock pin mechanism 32 locks the opposite end of support tube 14 in position to the opposite side of doorway 16. Accordingly, support tube 14 and hence support mechanism 22 are fixedly held in position with respect to the fuselage 18 of the aircraft 10 and support tube 14 is shaped or bowed to extend viewer support 22 outboard of fuselage 18. When the viewer is not in use, lock pin mechanism 32 can be released and the support tube 14, with the viewer support 22 still installed thereon, can be pivoted about pivot pin assembly 24 into a stowed position within fuselage 18 and locked in this stowed position by a mechanism similar to lock pin 32.

Figure 3:
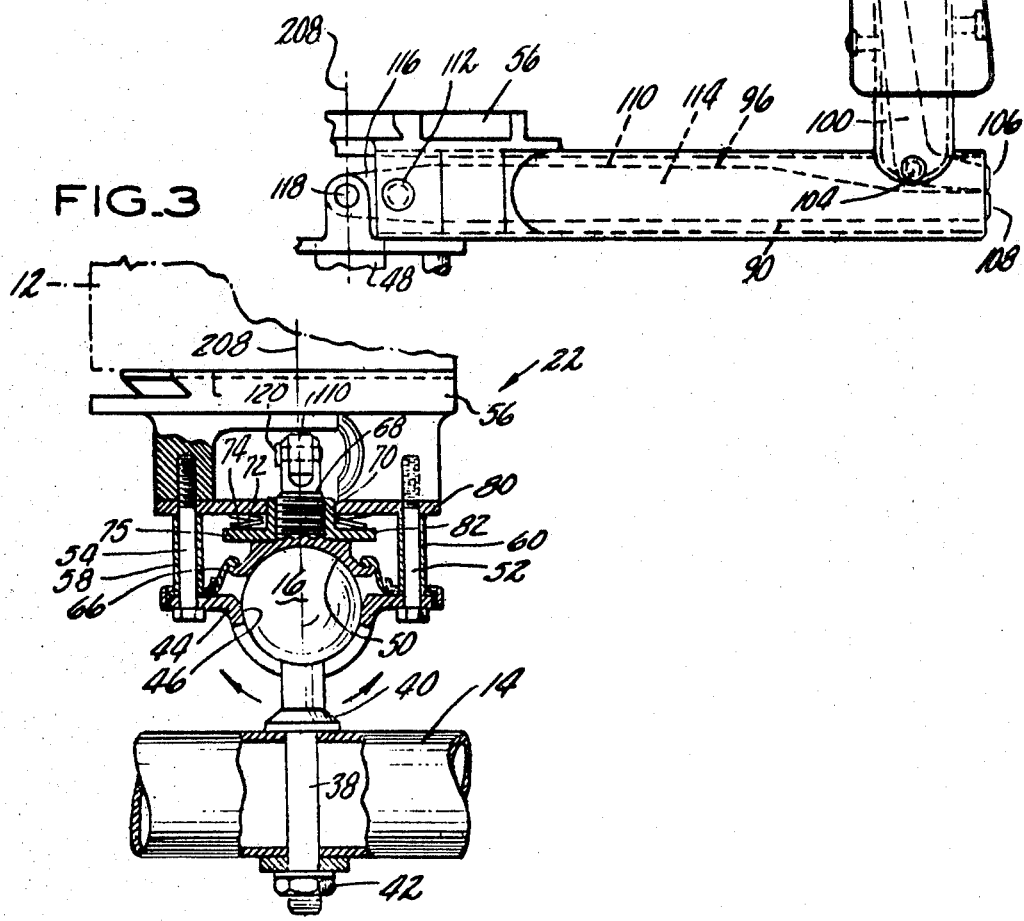
FIG. 3 is an enlarged cross-sectional showing depicting my mounting means in detail.

Referring to FIG. 3 we see my viewer support mechanism 22 shown in greater particularity and supporting viewer 12 from support tube 14. Ball or spherical member 16 has pin member 38 projecting therefrom and passing through support tube 14 so as to be fixedly positioned therefrom by the coaction of nut or ring member 40 and nut member 42 which engages the threads on pin member 38. Accordingly, ball member 16 is fixed in position and supported by tube assembly 14 from the aircraft fuselage 18. We will see that all other portions of my support mechanism 22 are movable with respect to ball 16 and can be caused either to be locked in position with respect to ball member 16 or unlocked therefrom wholly or partially so that relative motion of a universal nature can take place therebetween.

Static friction cup member 44, which has a spherical inner surface 46 which matingly engages the outer spherical periphery of ball member 16, is positioned on one side of ball member 16. Movable friction cup member 48, which has an inner spherical surface 50, which matingly engages the spherical surface of ball 16, is located substantially on the diametrically opposite side of ball member 16. Bolt members 52 and 54 pass through appropriate apertures 202 in static friction cup member 44 and threadably engage support platform 56 so that, with the assistance of spacer sleeves 58 and 60, support platform 56 is supported in fixed and spaced relation to static friction cup 44. Annular and flexible seal member 66 extends between static and movable friction cups 44 and 48 to prevent foreign matter from entering the space between the friction cups so as to become wedged between the friction cups and ball member 16 to thereby adversely affect viewer operation.

Movable friction cup 48 has threaded stem 68 which threadably engages load adjusting ring or nut 70. Belleville spring washers 72 and 74 extend between the skirt 75 of adjusting ring 70 and plate member 80 of support platform 56 so as to impose a very stiff or strong spring load between adjusting ring 70 and support platform ring 80 and therefore between movable friction cup member 48 and static friction cup member 44, which are attached thereto, respectively. Belleville washers 72 and 74 therefore serve to bias the friction cup members 44 and 48 toward one another and into very heavy friction engagement with ball member 16. Adjusting ring 70 can be rotated to regulate this spring biasing force to establish both a preset force, and a force which can be varied readily during viewer operation since the skirt portion 75 of the adjusting ring 70 includes a series of peripheral apertures, such as 82, into which any lever member, such as a screwdriver, can be inserted to readily adjust the position of ring member 70 and hence the biasing or loading of the system.

It is important to note that with the cup members so mounted, the cup members are brought into locking engagement with ball member 16 directly and without any type of rotary motion therebetween. This is important because it saves wear between the friction cup members and the ball member.

It is necessary that provisions be made for releasing the viewer support platform 56 from ball member 16 and this mechanism will now be described and for this purpose reference is hereby made to FIG. 4. It should be born in mind that while a mechanical system is shown here, it will be evident to those skilled in the art that a hydraulic or an electromagnetic system could be substituted therefore. It is important, however, that the system have a high velocity ratio so that a low force, and substantial operator motion input results in high force, and minimal motion unlocking outputs at the viewer support mechanism 22. Handle 90 projects from support platform 56 and has pistol grip 92 forming a part thereof so that the operator can grab pistol grip 92 with one hand and, with the support mechanism released from ball mechanism 16, can move the support 56 thereabout to any selected position. With the viewer in the newly selected position, the viewer mount is then locked in position on ball member 16.

To perform this mount locking and unlocking function, the operator utilizes trigger mechanism 94 which is connected to movable friction cup member 48 through a high velocity ratio linkage system 96. As used herein, the term high velocity ratio means that for a low pressure, substantial motion of trigger 94, a high force, minimum motion will occur at movable friction cup 48. Such a system could also be called a high lever advantage or high mechanical advantage system.

Figure 4:
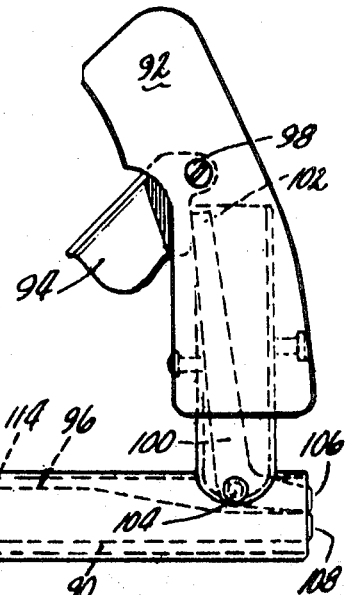
FIG. 4 is a showing of the high velocity ratio mechanical connection between the pilot operated trigger and the viewer mount locking and unlocking means.

It will be noted by viewing FIG. 4, that trigger 94 is pivotally connected at pivot point 98 to pistol grip 92 for pivot motion thereabout and is shaped to engage pivotally mounted link or crank member 100 at end 102 thereof. Member 100 is pivotally mounted in handle 90 to be pivotable about pivot point 104 and includes a shorter arm 106 extending therefrom to engage end 108 of lever 110. Lever 110 is pivotally mounted in viewer support platform 56 to be pivotable about pivot point 112 and so as to have long arm 114 projecting therefrom to engage link 100 and to have short arm 116 projecting therefrom to pivotally connect to movable friction cup member 48 at pivot joint 118. Due to the shape and selectively positioned pivot mountings of trigger 94 and levers 100 and 110, trigger 94 has a lever advantage of 2:1, lever 100 has a lever advantage of 4:1, and lever 110 has a lever advantage of 10:1 so as to give an overall system advantage of 80:1. Removable pin 120 forms part of pivot joint 118 and connects lever 110 to movable friction cup 48.

It will therefore be seen by the pressing trigger 94 the operator can with one hand cause friction cup 48 to move away from ball member 16, thereby releasing support platform 56 from ball member 16 and the operator can then selectively position support 56 in any selected position by manipulating handle 90 as desired. With the viewer in its newly selected position, release of trigger 94 will permit Belleville washers 72 and 74 to force friction cups 48 and 44 into high friction engagement with ball member 16 once again, thereby locking the mount 56 and viewer 12 in position.

The importance of the very high lever advantage or velocity ratio of 80:1 described above is that a ten pound force imposed by the operator upon trigger 94 will impose an 800 pound releasing or unlocking force of movable friction cup 48 so as to overcome the biasing forces of Belleville washers 72 and 74. This 80:1 lever advantage is further significant in that any motion which the operator imparts to trigger 94 is reflected in one-eightieth of that motion at movable friction cup 48. This is highly significant in that the operator can very selectively and accurately impose any desired amount of force upon movable friction cup 48 so as to either completely or partially overcome Belleville washer springs 72–74. With the spring force partially overcome, the operator retains a selected amount of friction loading between the friction cups and the ball member 16 and he has a "feel" for the amount of friction loading remaining as he moves handle 90. This is very important to viewer mounting mechanism located in the vibrating turbulent environment of an aircraft.

Referring to FIG. 5 we see static friction cup member 44 in greater particularity. It is important to note that it has both a skirt portion 200 through which bolt holes 202 project to receive bolt members such as 52 and 54 of FIG. 3, and also includes spherical portion 204. Arcuate slot 206, which is normal to cup axis 208, is located within spherical portion 204 of the static friction cup 44 and extends a selected arcuate distance and is of selected width to receive stem 38. Stem 38 of ball member 16 passes through slot 206 along axis 208 so as to provide universal motion for the support platform or mount 56. It will be evident that with trigger 94 depressed, the movable portions of the viewer support mechanism 22, including friction cup 48 are movable about axis 208 to any desired angle and then movable with respect to ball 16 in an additional degree of freedom due to the relative motion which is permitted for stem 38 within slot 206.

It is important to note that with our support platform 56 mounted on fixed ball 16, and operable through handle 90, all motions of the support and hence the viewer occur about a single geometric point, namely, the geometric center of ball 16. Such a mounting is considerably of benefit to the operator in positioning the viewer since it is easier to position the viewer with this mechanism than it would be if the viewer were mounted for rotation about two different and spaced trunnions.

I wish it to be understood that I do not desire to be limited to the exact details of construction shown and described, for obvious modifications will occur to a person skilled in the art.

We claim:

1. A universally movable and lockable mount including:
   A. a ball member, we
   B. means fixedly supporting said ball member in selected position,
   C. movable support means mounted for universal motion with respect to the fixed ball including:
      1. a first partially spherical member positioned and shaped to matingly engage a portion of the surface of said ball member,
      2. a second partially spherical member positioned and shaped to matingly engage another portion of the surface of the ball member,
      3. connecting means to support said first and second spherical members for universal motion together about said ball member,
      4. support mechanism connected to said connecting means,
      5. locking means to cause said first and second partially spherical members to move toward one another to bear against said ball member to thereby lock said support mechanism in a fixed position with respect to said ball member,
      6. unlocking means to cause said first and second partially spherical members to separate and release from or reduce friction engagement with said ball member, and
      7. handle means connected to and operable to universally move said support mechanism with respect to said ball member with said first and second spherical members so released,
   wherein said locking means is an adjustable spring loaded member biased to cause said partially spherical members to move toward one another and friction lock on said ball member,
   further, wherein said handle means includes a trigger and further including connecting means of high mechanical advantage connecting said trigger to one of said partially spherical members so that low power, high travel motion of said trigger will cause high power, low travel motion of said partially spherical member to overcome said spring biased locking means and free said support mechanism for universal motion with respect to said ball member through the motion of said handle member,
   and including seal means extending between said first and second partially spherical members to prevent admission of foreign matter between said ball member and said partially spherical members,
   further, wherein one of said partially spherical members includes slot means of selected width and arcuate dimension extending through a portion of the spherical portion thereof normal to the spherical portion axis so that, with said unlocking means actuated, said movable support means can be rotated about said spherical portion axis and along said slot means to effect universal motion, and still further including removable pin means connecting one of said partially spherical members to said second lever member and also including bolt means connecting the other of said partially spherical members to said support mechanism so that said movable support means can be released and removed from said ball member by unbolting said bolt means and wherein said handle member can be released and removed from one of said partially spherical members by removing said removable pin.

2. A universally movable and lockable mount including:
A. a ball member,
B. means fixedly supporting said ball member in selected position,
C. movable support means mounted for universal motion with respect to the fixed ball including:
1. a first partially spherical member positioned and shaped to matingly engage a portion of the surface of said ball member,
2. a second partially spherical member positioned and shaped to matingly engage another portion of the surface of the ball member,
3. connecting means to support said first and second spherical members for universal motion together about said ball member,
4. support mechanism connected to said connecting means,
5. locking means to cause said first and second partially spherical members to move toward one another to bear against said ball member to thereby lock said support mechanism in a fixed position with respect to said ball member,
6. unlocking means to cause said first and second partially spherical members to separate and release from or reduce friction engagement with said ball member, and
7. handle means connecting to and operable to universally move said support mechanism with respect to said ball member with said first and second spherical members so released, and wherein said ball member supporting means comprises a selectively shaped support tube member to which said ball member attaches and which is adapted to extend between two support members and including:
A. a first end with provisions to be pivotally connected to one of the support members.
B. a second end with provisions to be releasably connected to the other support member and to any adjacent support member when the support member is in any pivoted position with respect to its pivotally supported end.

3. A universally movable and lockable mount including:
A. a fixed ball member,
B. a static friction cup member shaped and positioned to be in mating friction engagement with said ball member,
C. a movable friction cup member positioned on the opposite side of said ball member from said static friction cup member and adapted to be moved toward and away from said ball member without rotation, and shaped to matingly frictionally engage said ball members when brought in contact therewith,
D. mount means connected to said static friction cup member,
E. locking means biased to move said friction cup members toward one another and into high load, high friction engagement with said ball member so as to lock said mount means in position with respect to said ball member, and
F. unlocking means to cause said movable friction cup to move away from said ball member without rotation so as to release said friction cup members and hence said mount means for universal motion with respect to said fixed ball member, wherein said locking means includes a handle member connected to said camera support means and having a pistol grip portion with a depressible trigger attached thereto and further including mechanical connecting means of high velocity ratio between said trigger and said movable friction cup member so that operator depression of said trigger will move said movable friction cup member away from said fixed ball member to release said friction cups and mount means for universal motion with respect to the fixed ball member in response to operator imposed handle motion and wherein said high velocity ratio mechanical connection permits the operator to selectively depress the trigger so as to selectively reduce the amount of friction engagement between the friction cups and the fixed ball member so that by coaction of the trigger and handle, the operator can selectively reduce the friction between the friction cups and the ball member in accordance with the amount of friction which he feels or experiences as he operates the handle to move the mount means with respect to the ball member, wherein said locking means is an adjustable spring loaded member biased to cause said cup members to move toward one another and friction lock on said ball member, and including seal means extending between said cup members to prevent admission of foreign matter between said ball member and said cup members, further, wherein said static cup member includes slot means of selected width and arcuate dimension extending through a portion thereof, further, wherein said trigger is pivotally mounted and shaped to have a lever advantage greater than one and wherein said high velocity ratio connecting means includes:
A. a first lever member pivotally mounted and shaped to have a lever advantage greater than one and positioned to bear against said trigger so that pivot motion of said trigger actuates said first lever member, and
B. a second lever member pivotally mounted and shaped to have a lever advantage greater than one and positioned to bear against said first lever member so that motion of said trigger and said first lever member causes pivot motion of said second lever member and also being connected at its opposite end to said movable cup member so as to cause said cup members to separate and unlock said mount means for universal motion with respect to said fixed ball member in response to trigger depressing motion, and still further including removable pin means connecting said movable cup member to said lever member and also including bolt means connecting said static cup member to said mount means so that said mount means can be released and removed from said ball member by unbolting said bolt means and wherein said handle member can be released and removed from said movable cup member by removing said removable pin.

4. A universally movable and lockable mount including:
  A. a ball member adapted to be fixedly mounted,
  B. movable support means mounted for universal motion with respect to the ball member including:
     1. a first substantially semi-spherical cup member positioned and shaped to matingly engage a substantially semi-spherical portion of the surface of said ball member,
     2. a second substantially semi-spherical cup member positioned and shaped to matingly engage another substantially semi-spherical portion of the surface of the ball member,
     3. connecting means to support said first and second cup members on opposite side of said ball member and for universal motion together about said ball member,
     4. support mechanism connected to said first cup member,
     5. locking means comprising spring biasing means positioned between said support mechanism and said second cup member to cause said first and second cup members to move toward one another to bear against said ball member to thereby lock said support mechanism in a fixed position with respect to said ball member,
     6. adjustment means for said spring biasing means comprising a member mounted to be rotatable with respect to said support mechanism and threadably engaging said second cup member and shaped to define a chamber with said support mechanisms to receive said biasing spring means so that rotation of said adjustment means varies the force generated by said biasing spring in baising said cup members against said ball member, and
     7. unlocking means comprising a high velocity ratio linkage operable to overcome said spring biasing means to cause said first and second cup members to separate and release from or reduce friction engagement with said ball member.

5. A universally movable and lockable mount including:
  A. a ball member,
  B. means fixedly supporting said ball member in selected position,
  C. movable support means mounted for universal motion with respect to the fixed ball including:
     1. a first partially spherical member positioned and shaped to matingly engage a portion of the surface of said ball member,
     2. a second partially spherical member positioned and shaped to matingly engage another portion of the surface of the ball member,
     3. connecting means to support said first and second spherical members for universal motion together about said ball member
     4. support mechanism connected to said connecting means,
     5. locking means to cause said first and second partially spherical members to move toward one another to bear against said ball member to thereby lock said support mechanism in a fixed position with respect to said ball member,
     6. unlocking means to cause said first and second partially spherical members to separate and release from or reduce friction engagement with said ball members, and
     7. handle means connected to and operable to universally move said support mechanism with respect to said ball member with said first and second spherical members so released,
  wherein said locking means is an adjustable spring loaded member biased to cause said partially spherical members to move toward one another and friction lock on said ball member,
  further, wherein said handle means includes a trigger and further including connecting means of high mechanical advantage connecting said trigger to one of said partially spherical members so that low power, high travel motion of said trigger will cause high power, low travel motion of said partially spherical member to overcome said spring biased locking means and free said support mechanism for universal motion with respect to said ball member through the motion of said handle member,
  and including seal means extending between said first and second partially spherical members to prevent admission of foreign matter between said ball member and said partially spherical members, and
  still further, wherein one of said partially spherical members includes slot means of selected width and arcuate dimension extending through a portion of the spherical portion thereof normal to the spherical portion axis so that, with said unlocking means actuated, said movable support means can be rotated about said spherical portion axis and along said slot means to effect universal motion.

6. Apparatus according to claim 5 wherein said trigger is pivotally mounted and shaped to have a lever advantage greater than one and wherein said high mechanical advantage connecting means includes:
  A. a first lever member pivotally mounted and shaped to have a lever advantage greater than one and positioned to bear against said trigger so that pivot motion of said trigger actuates said first lever member and,
  B. a second lever member pivotally mounted and shaped to have a lever advantage greater than one and positioned to bear against said first lever member so that motion of said trigger and said first lever member causes pivot motion of said second lever member and also being connected at its opposite end to one of said partially spherical members so as to cause said partially spherical members to separate and unlock said support mechanism for universal motion with respect to said fixed ball member in response to trigger depressing motion.

\* \* \* \* \*